(No Model.)

J. H. BAILEY.
COMBINED PLANTER AND FERTILIZER DISTRIBUTER.

No. 578,188. Patented Mar. 2, 1897.

Witnesses
Inventor
James H Bailey,
By his Attorneys,

UNITED STATES PATENT OFFICE.

JAMES H. BAILEY, OF LEADING CREEK, WEST VIRGINIA.

COMBINED PLANTER AND FERTILIZER-DISTRIBUTER.

SPECIFICATION forming part of Letters Patent No. 578,188, dated March 2, 1897.

Application filed March 26, 1896. Serial No. 584,950. (No model.)

*To all whom it may concern:*

Be it known that I, JAMES H. BAILEY, a citizen of the United States, residing at Leading Creek, in the county of Lewis and State of West Virginia, have invented a new and useful Combined Planter and Fertilizer-Distributer, of which the following is a specification.

This invention relates to that class of agricultural machines designed for planting seed and at the same time depositing a quantity of fertilizer in the same hill or furrow with the seed, and aims to provide a structure which will plant the seed in any kind of soil in such a way as to insure its germinating, and which will be light-running, positive in its action, open the ground to a required depth, cover the seed and fertilizer, and capable of being readily repaired at a small cost and without requiring the forwarding of the machine to a shop for the purpose.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1:
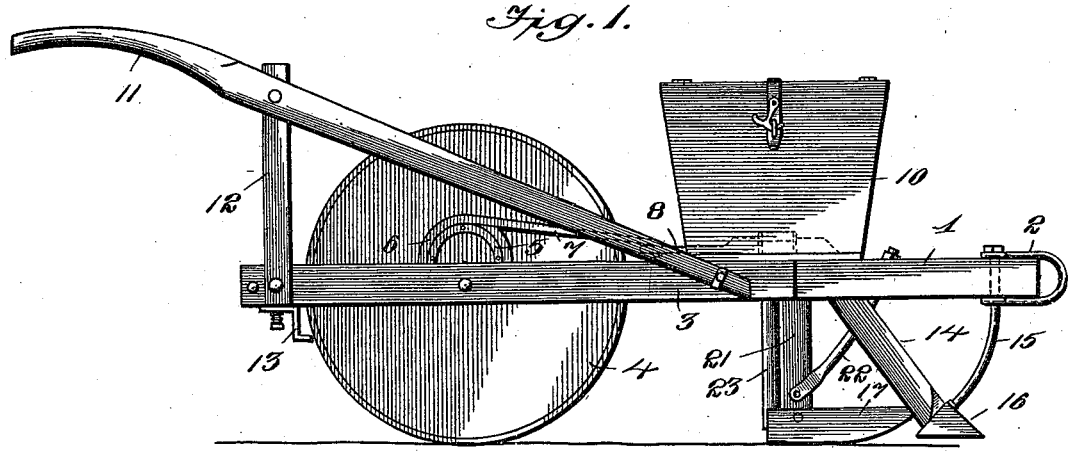
Figure 2:
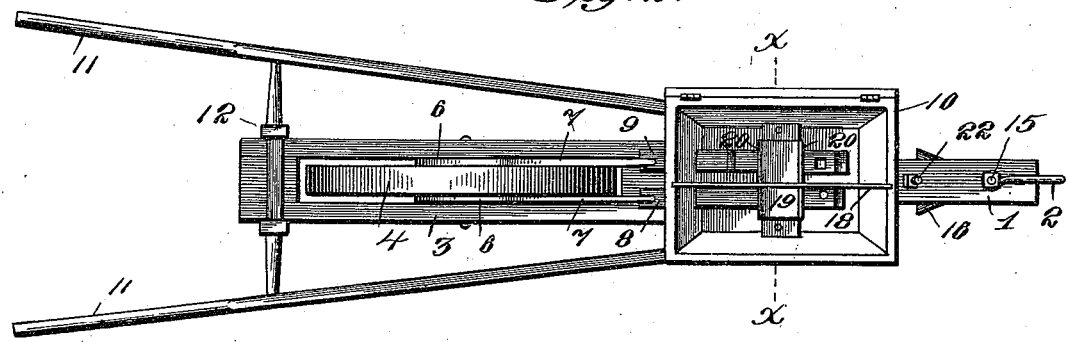
Figure 3:
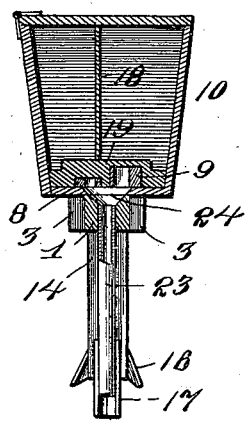
Figure 4:
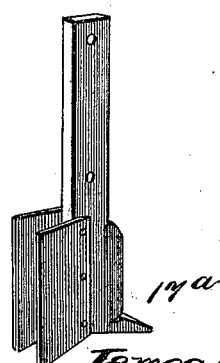

Figure 1 is a side elevation of a combined planter and fertilizer-distributer constructed in accordance with this invention. Fig. 2 is a top plan view thereof. Fig. 3 is a transverse section of the hopper, its supporting-beam, and the upper portion of the grain-spout about on the line X X of Fig. 2. Fig. 4 shows a form of opener to be used when the ground is hard and difficult of penetration.

Corresponding and like parts are referred to in the following description and indicated in the several views of the drawings by the same reference-characters.

The frame of the machine comprises a short beam 1, having a clevis 2 at its front end, to which the draft is applied, and parallel side bars 3, the latter being secured to or forming a part of the beam 1 and spaced apart a sufficient distance to receive the ground-wheel 4 between them. Eccentrics 5 are provided on the sides of the ground-wheel and coöperate with yokes or straps 6, forming a part of pitmen 7, to reciprocate the dropping-slides 8 and 9 within the hopper 10. Handles 11 are secured to the frame and are braced by stays 12, and enable the operator to guide the machine and control its movements. The tread of the ground-wheel 4 is kept clean by means of a scraper 13, which is secured to the rear end of the frame, thereby preventing the banking of earth and trash upon the periphery of the wheel, which would impede the progress of the planter and render its movements unsteady.

A plow-stock 14 is fitted to the front end of the frame and is strengthened by a brace 15, having connection therewith at its lower end and curving forward and upward and secured to the frame by passing through an opening in the beam 1. The foot or shovel 16, fitted to the lower end of the plow-stock, is designed to precede the opener 17 to level the ground and remove roots, stones, and trash, and for this purpose has similar side wings and is of the type known as "double-pointed" shovels.

The hopper 10 is divided by a vertical partition 18 into two compartments, the one receiving the grain and the other the fertilizer. A transverse block 19 is fitted to the bottom of the hopper, and the dropping-slides 8 and 9 operate therethrough, strips of rubber, felt, or cloth 20 being applied to the sides of the block to secure a close fit against the sides of the slides, so as to prevent the grain and fertilizer from choking the openings in the block through which the slides reciprocate. The slides may have one or more openings, according as it is required to drop the seed or fertilizer at the end of each stroke or at the end of the forward or backward stroke of the slides.

The quantity of grain or fertilizer dropped is regulated by the size of the opening or openings and will vary according to the soil and the nature of the grain or fertilizer, and to attain this end the dropping-slides are removably fitted to the hopper, so as to be replaced by others having openings of different size. The front ends of the pitmen 7 are bent and enter openings in the rear ends of the dropping-slides, and when it is required to remove the dropping-slides the pitmen are disconnected therefrom and the slides drawn out through the openings in the rear side of the hopper and substituted by others having openings of required size to suit the charge to be dropped in a hill. The ends of the dropping-slides are beveled to obviate injury to the grain and to facilitate the reciprocating movements of the slides through the grain and fertilizer, which ride over and upon the said beveled ends, as will be readily understood.

A standard 21 is strengthened by a brace 22 and carries an opener 17, which is spread at its rear end and extends along the sides of the standard and in the rear thereof, forming wings which receive between them the lower end of the grain-spout 23, the latter coming in the rear of the standard 21 and protected thereby. The brace 22 passes through the upper portion of the stock 14 and through the beam 1, thereby materially assisting in strengthening the said stock 14. For moist and soft ground the opener 17 is long, and its nose enters the stock 14 and is braced thereby; but for hard soil the opener is short and shaped like a plow-point, as shown at 17ª in Fig. 4. The opening 24 in the frame, and with which the upper end of the grain-spout communicates, flares at its upper end, so as to receive the grain and fertilizer which are dropped therein by the reciprocating slides 8 and 9. Hence the grain and fertilizer commingle and pass through the same spout 23 into the furrow formed by the opener 17 and are covered by the furrow closing in the rear of the opener, the ground-wheel serving to compress the earth, so as to insure a proper germinating of the seed.

The draft is applied to the front end of the frame by hitching a horse to the clevis 2, and the operator guides the planter and directs its movements by means of the handles 11. As the ground-wheel rotates, the eccentrics 5 impart a reciprocating motion to the pitmen 7, and the latter, having connection with the dropping-slides, cause the latter to reciprocate and alternately bring the openings in the dropping-slides in communication with the hopper and the opening 24, whereby a deposit of grain and fertilizer is effected in the furrow made by the opener 17, as will be readily understood.

Having thus described the invention, what is claimed as new is—

In a planter, the combination with a beam, a hopper supported thereby, and seed-dropping mechanism, of a plow-stock attached to the said beam and bearing a double-pointed shovel, a curved brace connecting the lower end of the plow-stock with the front portion of the beam, a standard located immediately in the rear of the plow-stock, an opener secured to the lower end of the standard and having its nose engaged with and braced by the plow-stock, and a brace connected with the lower portion of the standard and passing through the aforesaid plow-stock and beam, substantially as shown for the purpose described.

In testimony that I claim the foregoing as my own I have hereto affixed my signature in the presence of two witnesses.

JAMES H. BAILEY.

Witnesses:
J. M. JARVIS,
C. L. BUSH.